(12) United States Patent
Satoh et al.

(10) Patent No.: US 11,648,917 B2
(45) Date of Patent: *May 16, 2023

(54) VEHICLE BRAKE SYSTEM

(71) Applicants: NISSIN KOGYO CO., LTD., Tomi (JP); VEONEER NISSIN BRAKE SYSTEMS JAPAN CO., LTD., Yokohama (JP); MITSUBISHI JIDOSHA KOGYO KABUSHIKI KAISHA, Tokyo (JP); NTN CORPORATION, Osaka (JP)

(72) Inventors: Hiromasa Satoh, Nagano (JP); Toshihiro Obika, Yokohama (JP); Yusuke Koga, Yokohama (JP); Hiromitsu Toyota, Tokyo (JP); Haruo Kotera, Tokyo (JP); Tatsuya Yamasaki, Iwata (JP); Yui Masuda, Iwata (JP)

(73) Assignees: MITSUBISHI JIDOSHA KOGYO KABUSHIKI KAISHA, Tokyo (JP); NTN CORPORATION, Osaka (JP); HITACHI ASTEMO, LTD., Nagano (JP); HITACHI ASTEMO UEDA CO., LTD., Nagano (JP)

( * ) Notice: Subject to any disclaimer, the term of this patent is extended or adjusted under 35 U.S.C. 154(b) by 92 days.

This patent is subject to a terminal disclaimer.

(21) Appl. No.: 16/499,046

(22) PCT Filed: Mar. 29, 2018

(86) PCT No.: PCT/JP2018/013436
§ 371 (c)(1),
(2) Date: Sep. 27, 2019

(87) PCT Pub. No.: WO2018/181808
PCT Pub. Date: Oct. 4, 2018

(65) Prior Publication Data
US 2020/0031322 A1 Jan. 30, 2020

(30) Foreign Application Priority Data

Mar. 31, 2017 (JP) .............................. JP2017-071354

(51) Int. Cl.
*B60T 13/74* (2006.01)
*B60T 8/17* (2006.01)
(Continued)

(52) U.S. Cl.
CPC ................ *B60T 8/17* (2013.01); *B60T 1/065* (2013.01); *B60T 13/741* (2013.01); *B60T 17/18* (2013.01);
(Continued)

(58) Field of Classification Search
CPC ............. F16D 2125/40; F16D 2121/24; B60T 13/741; B60T 13/74; B60T 2270/413;
(Continued)

(56) References Cited

U.S. PATENT DOCUMENTS 5,255,962 A 10/1993 Neuhaus et al.
6,029,108 A 2/2000 Belschner
(Continued)

FOREIGN PATENT DOCUMENTS

CN 101134459 A 3/2008
CN 103708027 A 4/2014
(Continued)

OTHER PUBLICATIONS

Exlended European Search Report for European Application No. 18774878.5, dated Oct. 28, 2020.
(Continued)

*Primary Examiner* — Nicholas J Lane
*Assistant Examiner* — Stephen M Bowes
(74) *Attorney, Agent, or Firm* — Birch, Stewart, Kolasch & Birch, LLP

(57) ABSTRACT

A highly reliable vehicle brake system that includes an electric brake and achieves redundancy at low cost is provided.

A vehicle brake system (1) is provided to a wheel (Wa) of a vehicle (VB), and includes an electric brake (16a) provided with a motor (80), a driver (60) that drives the motor (80), and a first control device (10) provided with a master controller (30) and a first sub-controller (40) connected to each other. The electric brake (16a) is controllable by both the master controller (30) and the first sub-controller (40).

7 Claims, 4 Drawing Sheets

(51) Int. Cl.
  *B60T 1/06* (2006.01)
  *B60T 17/18* (2006.01)
  *B60T 7/04* (2006.01)
  *B60T 8/32* (2006.01)

(52) U.S. Cl.
  CPC ............. *B60T 7/042* (2013.01); *B60T 8/3255* (2013.01); *B60T 2270/10* (2013.01); *B60T 2270/20* (2013.01); *B60T 2270/30* (2013.01); *B60T 2270/402* (2013.01); *B60T 2270/404* (2013.01); *B60T 2270/413* (2013.01); *B60T 2270/82* (2013.01)

(58) Field of Classification Search
  CPC ......... B60T 2270/402; B60T 2270/404; B60T 8/17; B60T 8/3255; B60T 1/065; B60T 17/18; B60T 7/042; B60T 2270/10; B60T 2270/20; B60T 2270/30; B60T 2270/82
  See application file for complete search history.

(56) References Cited

U.S. PATENT DOCUMENTS

| | | | | |
|---|---|---|---|---|
| 6,138,801 | A | 10/2000 | Shirai | |
| 6,256,570 | B1 | 7/2001 | Weiberle et al. | |
| 6,270,172 | B1* | 8/2001 | Shirai | B60T 7/042 |
| | | | | 303/112 |
| 6,299,261 | B1* | 10/2001 | Weiberle | B60T 13/74 |
| | | | | 303/122.04 |
| 6,317,675 | B1* | 11/2001 | Stolzl | B60T 8/321 |
| | | | | 701/76 |
| 6,345,225 | B1* | 2/2002 | Bohm | B60T 8/321 |
| | | | | 180/197 |
| 6,476,616 | B2 | 11/2002 | Yamamoto et al. | |
| 6,607,253 | B1* | 8/2003 | Yamamoto | B60T 7/042 |
| | | | | 188/181 T |
| 6,749,269 | B1 | 6/2004 | Niwa | |
| 2003/0006726 | A1* | 1/2003 | Weiberle | B60T 17/18 |
| | | | | 318/370 |
| 2007/0200520 | A1 | 8/2007 | Sakata | |
| 2008/0054716 | A1 | 3/2008 | Sato et al. | |
| 2009/0195058 | A1 | 8/2009 | Jackson et al. | |
| 2009/0223752 | A1* | 9/2009 | Kim | F16D 65/18 |
| | | | | 188/72.1 |
| 2010/0256867 | A1 | 10/2010 | Breuer et al. | |
| 2012/0065816 | A1* | 3/2012 | Cahill | B60T 8/1703 |
| | | | | 188/106 P |
| 2012/0150362 | A1* | 6/2012 | Kolbe | B60T 13/74 |
| | | | | 701/2 |
| 2013/0282249 | A1 | 10/2013 | Heise et al. | |
| 2014/0100719 | A1 | 4/2014 | Thibault | |
| 2014/0188343 | A1 | 7/2014 | Yoshimura et al. | |
| 2016/0264150 | A1 | 9/2016 | Freiwald et al. | |
| 2017/0072920 | A1 | 3/2017 | Besier et al. | |
| 2017/0240147 | A1 | 8/2017 | Kotera et al. | |
| 2018/0056960 | A1* | 3/2018 | Krueger | B60T 8/885 |
| 2018/0111626 | A1 | 4/2018 | Freiwald et al. | |
| 2018/0134264 | A1 | 5/2018 | Masuda | |
| 2018/0141530 | A1* | 5/2018 | Kilmurray | B60T 13/662 |
| 2018/0201240 | A1 | 7/2018 | Masuda | |
| 2020/0031323 | A1* | 1/2020 | Satoh | B60T 13/74 |

FOREIGN PATENT DOCUMENTS

| | | |
|---|---|---|
| CN | 104002784 A | 8/2014 |
| CN | 106458192 A | 2/2017 |
| DE | 102007042481 A1 | 3/2009 |
| DE | 10 2015 003 194 A1 | 9/2016 |
| EP | 2475206 A1 | 7/2012 |
| JP | 7-9980 A | 1/1995 |
| JP | 2001-138882 A | 5/2001 |
| JP | 2003-175811 A | 6/2003 |
| JP | 2003-220943 A | 8/2003 |
| JP | 2005-140165 A | 6/2005 |
| JP | 2006-219133 A | 8/2006 |
| JP | 2008-55992 A | 3/2008 |
| JP | 2013-212814 A | 10/2013 |
| JP | 2016-124509 A | 7/2016 |
| JP | 2016-170786 A | 9/2016 |
| WO | WO 2017/002452 A1 | 1/2017 |
| WO | WO 2017/047496 A1 | 3/2017 |

OTHER PUBLICATIONS

Chinese Office Action and Search Report for Chinese Application No. 201880021648.3. dated Apr. 2, 2021, with English translation of the Office Action.
English machine translation of JP-2013-212814-A, published on Oct. 17, 2013.
Japanese Office Action for Japanese Application No. 2019-510182, dated Mar. 2, 2021, with English translation.
Chinese Office Action and Search Report, dated Apr. 12, 2021, for Chinese Application No. 201880021656.8, with an English machine translation of the Chinese Office Action.
Extended European Search Report for European Application No. 18776952.6, dated Nov. 30, 2020.
International Search Report, dated Jun. 5, 2018, for International Application No. PCT/JP2018/013433.
Japanese Office Action, dated Apr. 13, 2021, for Japanese Application No. 2019-510179, with an English machine translation.
Chinese Office Action and Search Report for Chinese Application No. 201880021648.3 dated Sep. 8, 2021, with English translation.
Japanese Office Action for Japanese Application No. 2019-510179, dated Aug. 17, 2021 with English translation.
Chinese Office Action dated Oct. 11, 2021, for Chinese Application No. 201880021656.8 with an English machine translation of the Office Action.
Chinese Office Action for Chinese Application No. 201880021648. 3, dated Dec. 2, 2021, with English translation.
Chinese Office Action for Chinese Application No. 201880021656. 8, dated Feb. 7, 2022, with English translation.
Japanese Office Action for Japanese Application No. 2019-510179, dated Feb. 22, 2022, with English translation.
U.S. Office Action for U.S. Appl. No. 16/499,018, dated Mar. 31, 2022.

* cited by examiner

VEHICLE BRAKE SYSTEM

TECHNICAL FIELD

The present invention relates to a highly reliable vehicle brake system provided with an electric brake.

BACKGROUND ART

For an electrical control system of a vehicle brake system, there has been suggested a system provided with a central control device and a motor control unit for each of the wheels (PTL 1). In the above system, a motor is controlled, via a drive IC, by a main microcomputer installed in each of motor control devices. A malfunction of the main microcomputer can be detected with a monitoring microcomputer provided corresponding to the main microcomputer. However, redundancy is demanded, so that an electric brake of the wheel can be successively operated even in case where, for example, the main microcomputer had a breakdown.

CITATION LIST

Patent Literature

PTL 1: JP-A-2001-138882

SUMMARY OF INVENTION

Technical Problem

An object of the invention is to provide a vehicle brake system provided with an electric brake, which is low-cost and has high reliability.

Solution to Problem

The invention has been made to achieve at least part of the above object, and can be achieved as the following embodiments or the application examples.
<1>
According to one embodiment of the invention, there is provided a vehicle brake system including:
an electric brake including at least one unit of an electric actuator that presses a friction pad toward a rotor side;
a driver that drives the electric actuator; and
a control device including a plurality of controllers connected to one another,
the electric brake being provided to each of a plurality of wheels of a vehicle,
the plurality of controllers including:
a master controller including a driver control unit that controls the driver, a braking force calculation unit that calculates braking force of the electric brake, and a behavior control unit that controls behaviors of the vehicle; and
a sub-controller including a driver control unit that controls the driver, and a braking force calculation unit that calculates braking force of the electric brake, and
the electric brake provided to at least one of the wheels being controllable by both the master controller and the sub-controller.
According to one embodiment of the above vehicle brake system, the electric brake provided to at least one of the wheels is controllable by both the master controller and the sub-controller, thus, even if, by chance, one of the master controller and the sub-controller has a breakdown, the electric brake is controllable by the other, thus achieving redundancy and improving reliability of the system.

According to one embodiment of the above vehicle brake system, the electric brake provided to at least one of the wheels is controllable by both the master controller and the sub-controller, thus various controls are possible for the electric brake.

Further, according to one embodiment of the above vehicle brake system, while achieving redundancy due to a use of a plurality of controllers, cost reduction can be achieved by not being mounted with a plurality of master controllers, which are relatively expensive.
<2>
In one embodiment of the above vehicle brake system,
the at least one of the wheels may be a front wheel of the vehicle.

According to one embodiment of the above vehicle brake system, the control of the electric brake with a large braking force, which is provided to the front wheel is made redundant, to further improve reliability of the system.
<3>
In one embodiment of the above vehicle brake system,
the control device may include a first control device and a second control device, and
the first control device may include the master controller and the sub-controller.

According to one embodiment of the above vehicle brake system, the master controller and the sub-controller are mounted onto an identical control device to shorten the communication line between the master controller and the sub-controller, thus achieving cost reduction, as well as improving reliability of the system.
<4>
In one embodiment of the above vehicle brake system,
the control device may include a first control device and a second control device,
the vehicle brake system may further include:
a brake pedal;
a stroke simulator connected to the brake pedal; and
a stroke sensor that detects an operation amount of the brake pedal, wherein
the first control device may be provided integrally with the stroke simulator and the stroke sensor.

According to one embodiment of the above vehicle brake system, the control device on which the master controller and the sub-controller are mounted is provided integrally with the stroke simulator and the stroke sensor, thus achieving space saving and improving vehicle mountability.
<5>
In one embodiment of the above vehicle brake system,
the master controller and the sub-controller may be both controllable of the same driver.

According to one embodiment of the above the vehicle brake system, the electric actuator included in the electric brake provided to one of the wheels can be driven from both the master controller and the sub-controller via the driver, thus, even if, by chance, one of the master controller and the sub-controller has a breakdown, the electric brake is controllable by the other, thus achieving redundancy and improving reliability of the system.
<6>
One embodiment of the vehicle brake system may include:
a plurality of the drivers that individually drive a plurality of the electric actuators included in the electric brake provided to the at least one of the wheels, the master controller controls one of the plurality of the drivers, and the sub-controller controls another one of the plurality of the drivers.

According to one embodiment of the above vehicle brake system, the driver controlled by the master controller and the driver controlled by the sub-controller are separately provided, thus, even if, by chance, one of the drivers has a breakdown, the other driver can drive the electric actuator, thus improving the redundancy and reliability of the system.

Further, according to one embodiment of the above vehicle brake system, the electric brake can be more accurately controlled to improve controllability of the electric brake.

<7>

In one embodiment of the above vehicle brake system, the behavior control unit performs, as a control of behaviors of the vehicle, at least one of a control to prevent locking of the wheels, a control to suppress slippage of the wheels, and a control to suppress sideslip of the vehicle.

According to one embodiment of the above vehicle brake system, the electric brake provided to at least one of the wheels is controllable by both the master controller and the sub-controller, thus various controls are possible for the electric brake.

DESCRIPTION OF EMBODIMENTS

Preferred embodiments of the invention will be described below in detail with reference to the drawings. The drawings used in the description are provided for convenience of explanation. Note that the embodiments described below do not unduly limit the contents of the invention described in the claims. Moreover, all of the elements described below are not necessarily essential requirements of the invention.

A vehicle brake system according to one embodiment of the invention includes an electric brake including at least one unit of an electric actuator that presses a friction pad toward a rotor side, a driver that drives the electric actuator, and a control device including a plurality of controllers connected to one another. The electric brake is provided to each of a plurality of wheels of a vehicle. The plurality of controllers include: a master controller including a driver control unit that controls the driver, a braking force calculation unit that calculates braking force of the electric brake, and a behavior control unit that controls behaviors of the vehicle; and a sub-controller including a driver control unit that controls the driver, and a braking force calculation unit that calculates braking force of the electric brake, and the electric brake provided to at least one of the wheels is controllable by both the master controller and the sub-controller.

1. Vehicle Brake System

Figure 1:
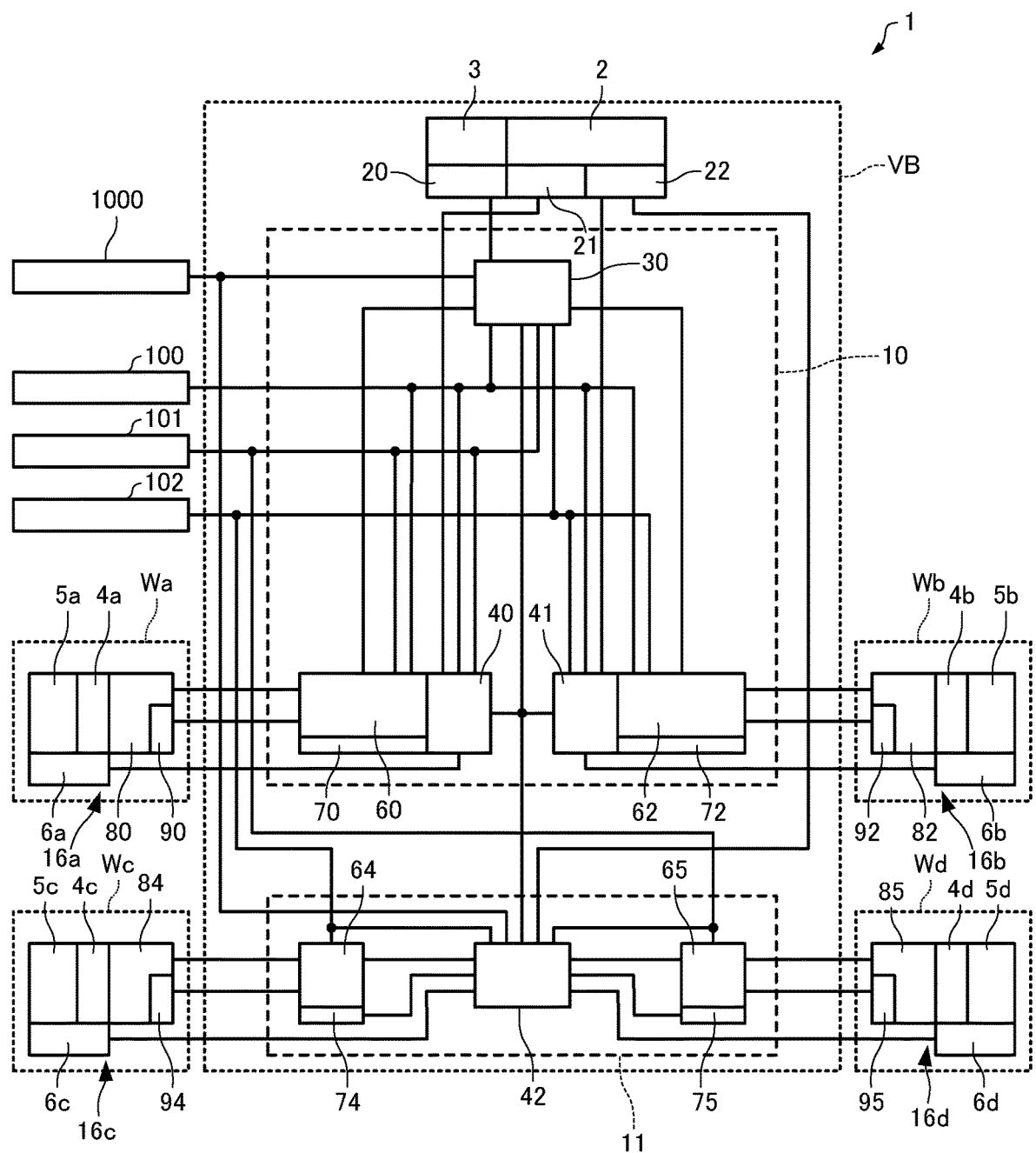
FIG. 1 is an overall configuration diagram illustrating a vehicle brake system according to an embodiment of the invention.
Figure 2:
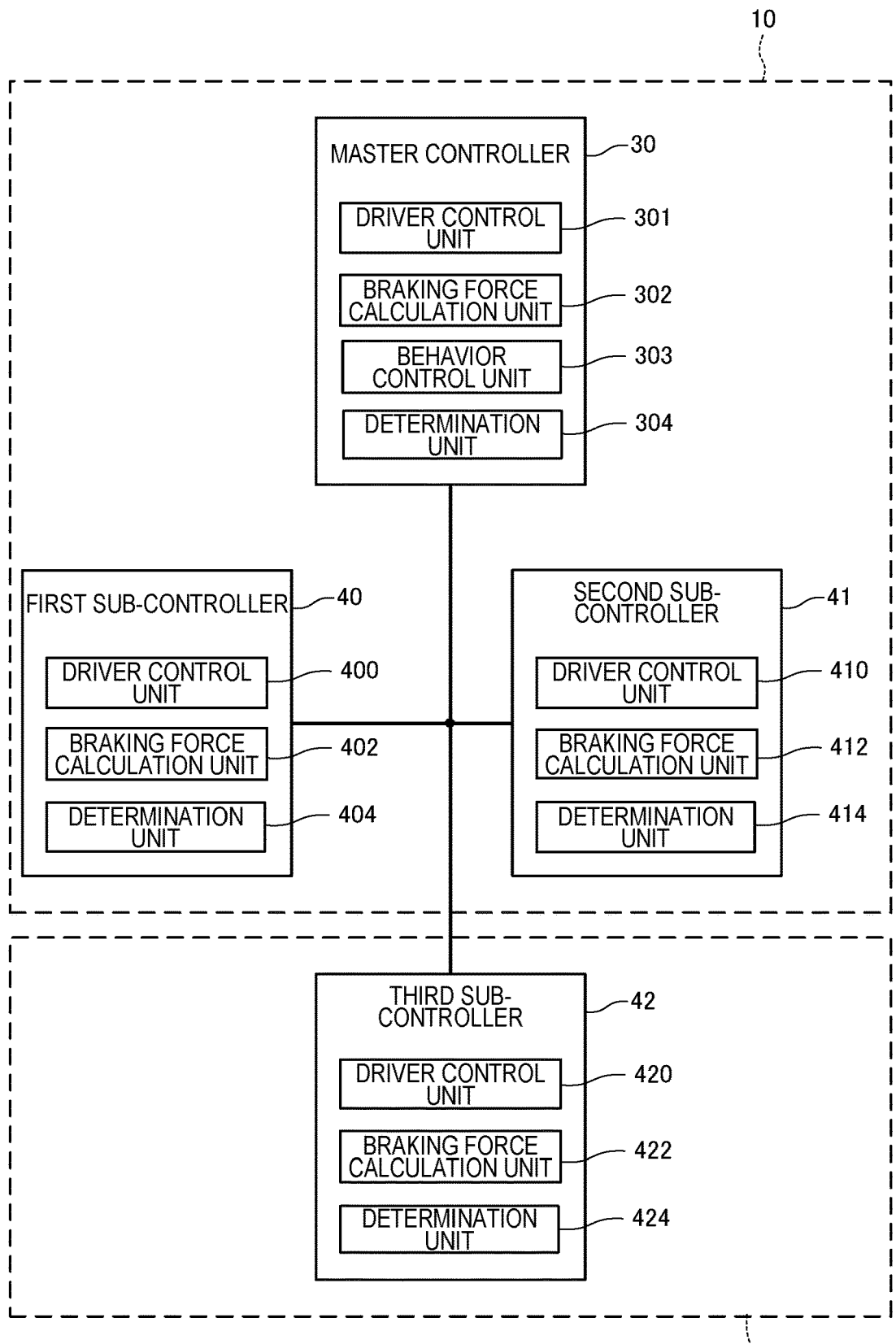
FIG. 2 is a block diagram illustrating a master controller and first to third sub-controllers of a vehicle brake system according to an embodiment of the invention.

A vehicle brake system 1 according to an embodiment of the invention will be described in detail with reference to FIGS. 1 and 2. FIG. 1 is an overall configuration diagram illustrating a vehicle brake system 1 according to the embodiment. FIG. 2 is a block diagram illustrating a master controller 30 and first to third sub-controllers 40 to 42 of the vehicle brake system 1 according to the embodiment.

As illustrated in FIG. 1, the vehicle brake system 1 includes electric brakes 16a to 16d including at least one unit of motors 80, 82, 84, and 85 that are electric actuators that press non-illustrated friction pads toward a non-illustrated rotor side, drivers 60, 62, 64, and 65 that drive the motors 80, 82, 84, and 85, and control devices (10 and 11) including a plurality of controllers (the master controller 30, the first sub-controller 40, the second sub-controller 41, and the third sub-controller 42) connected to one another. The non-illustrated rotors, which are provided to the wheels Wa to Wd of a vehicle VB being a four-wheeled vehicle, rotate integrally with the wheels Wa to Wd. Note that the vehicle VB is not limited to a four-wheeled vehicle. Further, a plurality of motors may be provided to one electric brake, or a plurality of electric brakes may be provided to one wheel.

1-1. Electric Brake

The electric brake 16a provided to the wheel Wa at the front-wheel left-side (FL) includes a brake caliper 5a, the motor 80 fixed to the brake caliper 5a via a decelerator 4a, and a load sensor 6a that detects a load applied from the motor 80 to the non-illustrated friction pads. The motor 80 includes a rotation angle sensor 90 that detects the relative position of the rotation axis with respect to the stator of its own. The detection signal from the load sensor 6a is input into the first sub-controller 40, and the detection signal from the rotation angle sensor 90 is input into the master controller 30 and the first sub-controller 40 via the driver 60.

The electric brake 16b provided to the wheel Wb at the front-wheel right-side (FR) includes a brake caliper 5b, the motor 82 fixed to the brake caliper 5b via a decelerator 4b, and a load sensor 6b that detects a load applied from the motor 82 to the non-illustrated friction pads. The motor 82 includes a rotation angle sensor 92 that detects the relative position of the rotation axis with respect to the stator of its own. The detection signal from the load sensor 6b is input into the second sub-controller 41 and the detection signal from the rotation angle sensor 92 is input into the master controller 30 and the second sub-controller 41 via the driver 62.

The electric brake 16c provided to the wheel Wc at the rear-wheel left-side (RL) includes a brake caliper 5c, a motor 84 fixed to the brake caliper 5c via a decelerator 4c, and a load sensor 6c that detects a load applied from the motor 84 to the non-illustrated friction pads. The motor 84 includes a rotation angle sensor 94 that detects the relative position of the rotation axis with respect to the stator of its own. The detection signal from the load sensor 6c is input into the third sub-controller 42, and the detection signal from the rotation angle sensor 94 is input into the third sub-controller 42 via the driver 64.

The electric brake 16d provided to the wheel Wd at the rear-wheel right-side (RR) includes a brake caliper 5d, a motor 85 fixed to the brake caliper 5d via a decelerator 4d, and a load sensor 6d that detects a load applied from the motor 85 to the non-illustrated friction pads. The motor 85 includes a rotation angle sensor 95 that detects the relative position of the rotation axis with respect to the stator of its own. The detection signal from the load sensor 6d is input into the third sub-controller 42, and the detection signal from the rotation angle sensor 95 is input into the third sub-controller 42 via the driver 65.

The brake calipers 5a to 5d are formed in a substantially C-shape, and are integrally provided with a claw portion extending to the opposite side across a non-illustrated rotor.

The decelerators 4a to 4d, which are fixed to the brake calipers 5a to 5d, transmit torque generated by the rotation of the motors 80, 82, 84, and 85 to non-illustrated linear motion mechanisms that are built into the brake calipers 5a to 5d.

The linear motion mechanism can employ a publicly known mechanism in the electric brake. The linear motion mechanism converts the rotation of the motors 80, 82, 84, and 85 into a linear motion of the friction pads via the decelerators 4a to 4d. The linear motion mechanism presses the friction pads toward the rotor to suppress the rotation of the wheels Wa to Wd.

The motors 80, 82, 84, and 85 can employ a publicly known electric motor, which is, for example, a brushless DC motor. Driving of the motor 80, 82, 84, and 85 causes the friction pads to move via the decelerators 4a to 4d and the linear motion mechanisms. An example will be described in which a motor is employed as the electric actuator, however, other publicly known actuators may be employed without being limited thereto.

1-2. Input Device

The vehicle brake system 1 includes a brake pedal 2 being an input device, and a stroke simulator 3 connected to the brake pedal 2. The brake pedal 2 includes a second stroke sensor 21 and a third stroke sensor 22 that detect the operation amount of the brake pedal 2 of the driver. The stroke simulator 3 includes a first stroke sensor 20 that detects the operation amount of the brake pedal 2.

Each of the stroke sensors 20 to 22 mutually independently generates an electrical detection signal corresponding to a depression stroke and/or a depression force being a kind of the operation amount of the brake pedal 2. The first stroke sensor 20 sends the detection signal to the master controller 30 to be described below. The second stroke sensor 21 sends the detection signal to the first sub-controller 40 to be described below. The third stroke sensor 22 sends the detection signal to the second sub-controller 41 and the third sub-controller 42 to be described below.

The vehicle VB includes, as an input device to the vehicle brake system 1, a plurality of control devices (hereinafter referred to as "other control devices 1000") provided in systems other than the vehicle brake system 1. The other control devices 1000 are connected by Controller Area Network (CAN) to the master controller 30 of the first control device 10 and to the third sub-controller 42 of the second control device 11 to communicate information about brake operation to each other.

1-3. Control Device

A control device includes the first control device 10 and the second control device 11. The first control device 10 is disposed at a predetermined position on the vehicle VB independently from the second control device 11. The first control device 10 and the second control device 11 are electronic control units (ECUs). Each of the first control device 10 and the second control device 11 is housed in a synthetic resin chassis. Accordingly, redundancy is achieved by the two control devices, which are the first control device 10 and the second control device 11. Note that an example is described in which two control devices are used, but one control device may be used in view of the disposition in the vehicle VB, or three or more may be used to further enhance redundancy.

The first control device 10 and the second control device 11 are connected via CAN, whereby communication is performed. The communication via CAN performs unidirectional and bidirectional information transmissions. Note that communication between ECU is not limited to CAN.

The first control device 10 and the second control device 11 are electrically connected to three batteries 100, 101, and 102 that are independent from one another. The batteries 100, 101, and 102 supplies electric power to electronic components included in the first control device 10 and the second control device 11. The batteries 100, 101, and 102 of the vehicle brake system 1 are arranged in predetermined positions in the vehicle VB.

The first control device 10 includes the master controller 30, the first sub-controller 40, the second sub-controller 41, and the drivers 60 and 62. The second control device 11 includes the third sub-controller 42 and the drivers 64 and 65. The master controller 30 and the first to third sub-controllers 40 to 42 are microcomputers. The first control device 10 is mounted with the plurality of controllers to improve redundancy and reliability in the first control device 10. The first control device 10 can also achieve cost reduction by not being mounted with a plurality of master controllers, which are relatively expensive. The master controller 30 needs high performance to provide a behavior control unit 303 (the behavior control unit 303 will be described below), and this causes the master controller 30 to become a relatively expensive controller compared to the first to third sub-controllers 40 to 42.

As illustrated in FIGS. 1 and 2, the master controller 30 includes a driver control unit 301 that controls the drivers 60 and 62, a braking force calculation unit 302 that calculates braking force of the electric brakes 16a to 16d, and the behavior control unit 303 that controls behaviors of the vehicle VB.

The first sub-controller 40 includes a driver control unit 400 that controls the driver 60, and a braking force calculation unit 402 that calculates braking force of the electric brakes 16a to 16d. The second sub-controller 41 includes a driver control unit 410 that controls the driver 62, and a braking force calculation unit 412 that calculates braking force of the electric brakes 16a to 16d. The third sub-controller 42 includes a driver control unit 420 that controls the drivers 64 and 65, and a braking force calculation unit 422 that calculates braking force of the electric brakes 16a to 16d. The first to third sub-controllers 40 to 42, due to the lack of the behavior control unit, can employ a microcomputer that is less expensive than the master controller 30, thus contributing to a cost reduction.

The drivers 60, 62, 64, and 65 control the drives of the motors 80, 82, 84, and 85. Specifically, the driver 60 controls the drive of the motor 80, the driver 62 controls the drive of the motor 82, the driver 64 controls the drive of the motor 84, and the driver 65 controls the drive of the motor 85. The drivers 60, 62, 64, and 65 control the motors 80, 82, 84, and 85 by sinusoidal drive scheme, for example. The drivers 60, 62, 64, and 65 may also control, for example, by square-wave current, without being limited to sinusoidal drive scheme.

The drivers 60, 62, 64, and 65 include a power supply circuit and an inverter that supply electric power being commensurate with the commands from the driver control units 301, 400, 410, and 420 to the motors 80, 82, 84, and 85.

The braking force calculation units 302, 402, 412, and 422 calculate braking force (required value) based on a detection signal from each of the stroke sensors 20 to 22, which is commensurate with the operation amount of the brake pedal 2. The braking force calculation units 302, 402, 412, and 422 can also calculate braking force (required value) based on a signal from other control devices 1000.

The driver control units 301, 400, 410, and 420 control the drivers 60, 62, 64, and 65 based on the braking forces (the required values) calculated by the braking force calculation units 302, 402, 412, and 422, detection signals from the load sensors 6a to 6d, and detection signals from the rotation angle sensors 90, 92, 94, and 95. The drivers 60, 62, 64, and 65 supply driving sinusoidal currents to the motors 80, 82, 84, and 85 in accordance with commands from the driver control units 301, 400, 410, and 420. The currents supplied to the motors 80, 82, 84, and 85 are detected by current sensors 70, 72, 74, and 75.

The behavior control unit 303 outputs signals for controlling behaviors of the vehicle VB to the driver control units 301, 400, 410, and 420. The above behaviors are other than simple braking behaviors in response to the operation of the brake pedal 2 being normal, that is, for example, Antilock Brake System (ABS), which is a control for preventing the wheels from being locked, Traction Control System (TCS), which is a control for suppressing slippage of the wheels Wa to Wd, and a behavior stabilization control, which is a control for suppressing sideslip of the vehicle VB.

The master controller 30 and the first to third sub-controllers 40 to 42 include determination units 304, 404, 414, and 424 that compare the braking force calculation results of the other controllers to determine braking force. The master controller 30 and the first to third sub-controllers 40 to 42, which include the determination units 304, 404, 414, and 424, separately use the controllers (30, 40, 41, and 42) in accordance with the braking force calculation results, to thus achieve redundancy of the vehicle brake system 1.

The determination units 304, 404, 414, and 424 compare the braking force calculation results of the other controllers to determine braking force. The other controllers are the first sub-controller 40, the second sub-controller 41, and the third sub-controller 42 for the determination unit 304, the master controller 30, the second sub-controller 41, and the third sub-controller 42 for the determination unit 404, the master controller 30, the first sub-controller 40, and the third sub-controller 42 for the determination unit 414, and the master controller 30, the first sub-controller 40, and the second sub-controller 41 for the determination unit 424. For example, the determination units 304, 404, 414, and 424 compare three of the calculation result of the braking force calculation unit 302 of the master controller 30, the calculation result of the braking force calculation unit 402 of the first sub-controller 40, the calculation result of the braking force calculation unit 412 of the second sub-controller 41, and the calculation result of the braking force calculation unit 422 of the third sub-controller 42 to determine, by majority decision, which calculation result will be used as the braking force. For example, in a case where the calculation result of the braking force calculation unit 402 is solely different from the other two calculation results (for example, the calculation results of the braking force calculation unit 302 and the braking force calculation unit 412), the master controller 30 controls the driver 60 and the driver 62 based on the calculation results of the braking force calculation unit 302 and the braking force calculation unit 412. That is, the determination units 304, 404, 414, and 424 make the vehicle brake system 1 redundant.

According to the vehicle brake system 1 of the embodiment, the electric brakes 16a and 16b provided to the wheels Wa and Wb are controllable by both the master controller 30 and the sub-controller (the first sub-controller 40 or the second sub-controller 41). More specifically, the motor 80 included in the electric brake 16a is driven by the driver 60 that can be controlled by the master controller 30 and the first sub-controller 40. Further, the motor 82 included in the electric brake 16b is driven by the driver 62 that can be controlled by the master controller 30 and the second sub-controller 41. Thus, according to the vehicle brake system 1 of the embodiment, even if, by chance, one of the master controller 30 and the first sub-controller 40 has a breakdown, the other can control the electric brake 16a, and even if one of the master controller 30 and the second sub-controller 41 has a breakdown, the other can control the electric brake 16b, thus achieving the redundancy and improving reliability of the system. Specifically, according to the vehicle brake system 1 of the embodiment, the control of the electric brakes 16a and 16b provided to the wheels Wa and Wb being the front wheels are made redundant to further improve the reliability.

According to the vehicle brake system 1 of the embodiment, the electric brakes 16a and 16b provided to the wheels Wa and Wb are controllable by both the master controller 30 and the first sub-controller 40, or both the master controller 30 and the second sub-controller 41, thus various controls are possible for the electric brake 16a.

Further, according to the vehicle brake system 1 of the embodiment, while achieving redundancy due to a use of a plurality of controllers (the master controller 30, the first sub-controller 40, and the second sub-controller 41), cost reduction can be achieved by not being mounted with a plurality of master controllers, which are relatively expensive.

According to the vehicle brake system 1 of the embodiment, the master controller 30, the first sub-controller 40, and the second sub-controller 41 are mounted onto the first control device 10 to shorten the communication line among the master controller 30 the first sub-controller 40, and the second sub-controller 41, thus achieving cost reduction, as well as improving the reliability, 2. Modified Example 1

Figure 3:
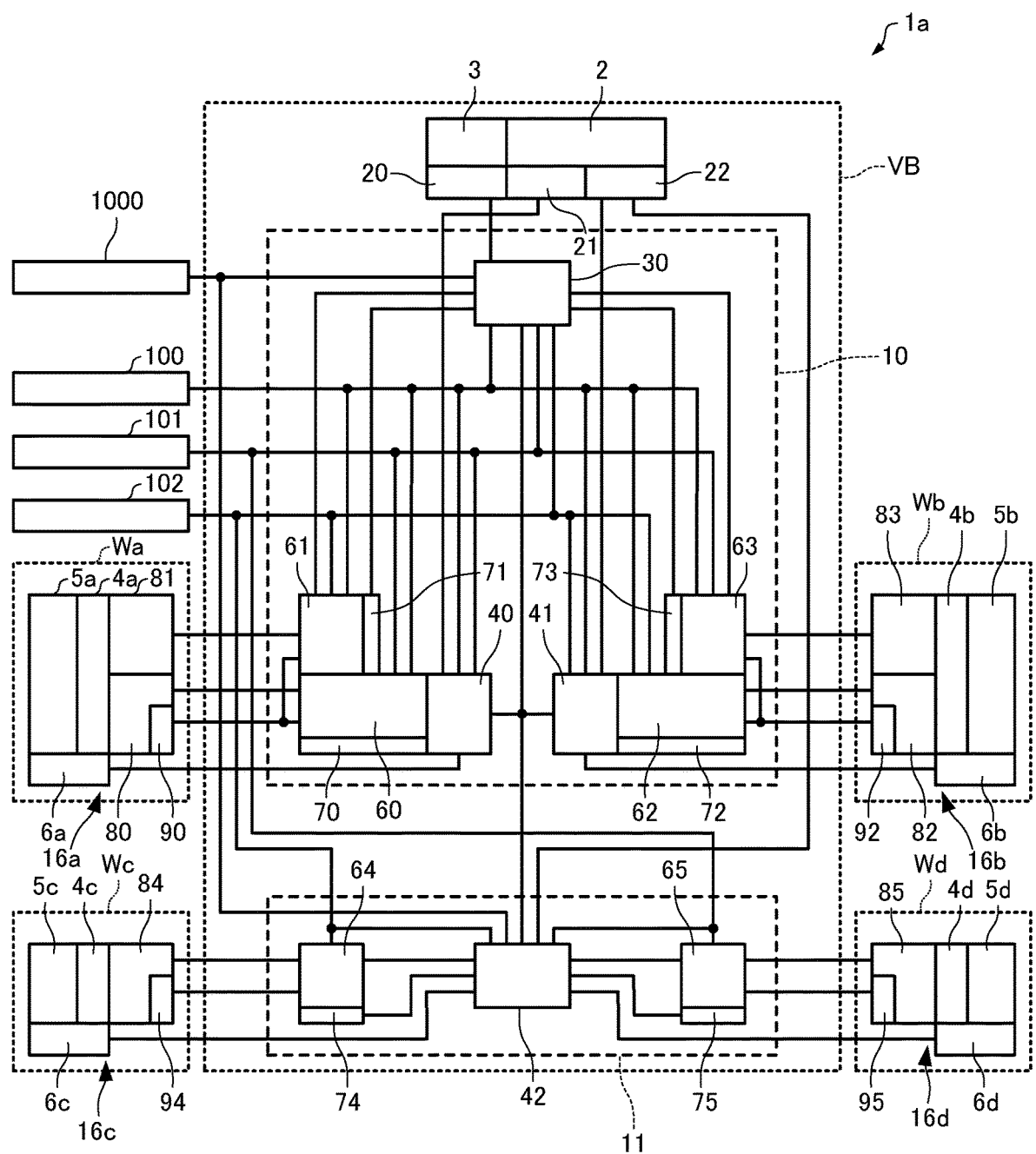
FIG. 3 is an overall configuration diagram illustrating a vehicle brake system according to Modified Example 1.

A vehicle brake system 1a according to Modified Example 1 will be described with reference to FIG. 3. FIG. 3 is an overall configuration diagram illustrating the vehicle brake system 1a according to Modified Example 1. In the following descriptions, the same components as in the vehicle brake system 1 of FIGS. 1 and 2 are denoted by the same reference signs in FIG. 3, and detailed descriptions thereof will be omitted.

As illustrated in FIG. 3, in the vehicle brake system 1a, the electric brake 16a further includes a motor 81, which is an electric actuator fixed to the brake caliper 5a via the decelerator 4a in the configuration illustrated in FIG. 1. The motor 81, which is coaxial with the motor 80, does not need a rotation angle sensor (shares the rotation angle sensor 90 with the motor 80). The electric brake 16b further includes a motor 83, which is an electric actuator fixed to the brake caliper 5b via the decelerator 4b. The motor 83, which is coaxial with the motor 82, does not need a rotation angle sensor (shares the rotation angle sensor 92 with the motor 82). The motors 81 and 83 can employ a publicly known electric motor, which is, for example, a brushless DC motor.

The first control device 10 further includes drivers 61 and 63 that drive the motors 81 and 83. The load sensor 6a detects a load applied from the motors 80 and 81 to non-illustrated friction pads. The detection signal from the load sensor 6a is input into the first sub-controller 40. The detection signal from the rotation angle sensor 90 is input, via the drivers 60 and 61, into the first sub-controller 40 and the master controller 30. The load sensor 6b detects a load applied from the motors 82 and 83 to the non-illustrated friction pads. The detection signal from the load sensor 6b is input into the second sub-controller 41. The detection signal from the rotation angle sensor 92 is input, via the drivers 62 and 63, into the second sub-controller 41 and the master controller 30.

The decelerator 4a transmits the torque generated by the rotation of the motors 80 and 81 to a non-illustrated linear mechanism being built into the brake caliper 5a. The linear mechanism converts the rotation of the motors 80 and 81 into a linear motion of the friction pad via the decelerator 4a, and presses the friction pad toward the rotor to suppress rotation of the wheel Wa. The decelerator 4b transmits the torque generated by the rotation of the motors 82 and 83 to a non-illustrated linear mechanism being built into the brake caliper 5b. The linear mechanism converts the rotation of the motors 82 and 83 into a linear motion of the friction pad via the decelerator 4b, and presses the friction pad toward the rotor to suppress rotation of the wheel Wb.

In the vehicle brake system 1a, configurations of the master controller 30 and the first to third sub-controllers 40 to 42 are the same as in FIG. 2, and thus diagrams and descriptions thereof are omitted. However, some of the functions of the master controller 30 differ from those in the vehicle brake system 1. That is, in the master controller 30, the driver control unit 301 controls the drivers 61 and 63.

The drivers 61 and 63 control the drives of the motors 81 and 83. Specifically, the driver 61 controls the drive of the motors 81, and the driver 63 controls the drive of the motor 83. The drivers 61 and 63 control the motors 81 and 83 by sinusoidal drive scheme, for example. The drivers 61 and 63 may also control, for example, by square-wave current, without being limited to sinusoidal drive scheme.

The drivers 61 and 63 include a power supply circuit and an inverter that supply electric power being commensurate with the commands from the driver control unit 301 to the motors 81 and 83. The drivers 61 and 63 supply driving sinusoidal currents to the motors 81 and 83 in accordance with commands from the driver control unit 301. The currents supplied to the motors 81 and 83 are detected by current sensors 71 and 73.

According to the vehicle brake system 1a of Modified Example 1, the electric brake 16a provided to the wheel Wa is controllable by both the master controller 30 and the first sub-controller 40, and the electric brake 16b provided to the wheel Wb is controllable by both the master controller 30 and the second sub-controller 41. More specifically, the plurality of motors 80 and 81 included in the electric brake 16a are driven by the plurality of drivers 60 and 61. The master controller 30 controls the driver 61, which is one of the plurality of drivers 60 and 61. The first sub-controller 40 controls the driver 60, which is another one of the plurality of drivers 60 and 61. Further, the plurality of motors 82 and 83 included in the electric brake 16b are driven by the plurality of drivers 62 and 63. The master controller 30 controls the driver 63, which is one of the plurality of drivers 62 and 63. The second sub-controller 41 controls the driver 62, which is another one of the plurality of drivers 62 and 63. Thus, according to the vehicle brake system 1a of Modified Example 1, even if, by chance, one of the master controller 30 and the first sub-controller 40 has a breakdown, the electric brake 16a is controllable by the other, and even if one of the master controller 30 and the second sub-controller 41 has a breakdown, the electric brake 16b is controllable by the other, thus achieving redundancy and improving the reliability. Specifically, according to the vehicle brake system 1a of Modified Example 1, the control of the electric brakes 16a and 16b provided to the wheels Wa and Wb being the front wheels are made redundant to further improve the reliability.

Further, according to the vehicle brake system 1a of Modified Example 1, the driver 61 controlled by the master controller 30 and the driver 60 controlled by the first sub-controller 40 are separately provided, thus, even if, by chance, one of the drivers 60 and 61 has a breakdown, the other of the drivers 60 and 61 can drive the other of the motors 80 and 81. Moreover, the driver 63 controlled by the master controller 30 and the driver 62 controlled by the second sub-controller 41 are separately provided, thus, even if, by chance, one of the drivers 62 and 63 has a breakdown, the other of the drivers 62 and 63 can drive the other of the motors 82 and 83. Thus, the vehicle brake system 1a according to Modified Example 1 improves the redundancy and reliability.

Further, according to the vehicle brake system 1a of Modified Example 1, the electric brakes 16a and 16b can be more accurately controlled to improve controllability of the electric brakes 16a and 16b.

3. Modified Example 2

Figure 4:
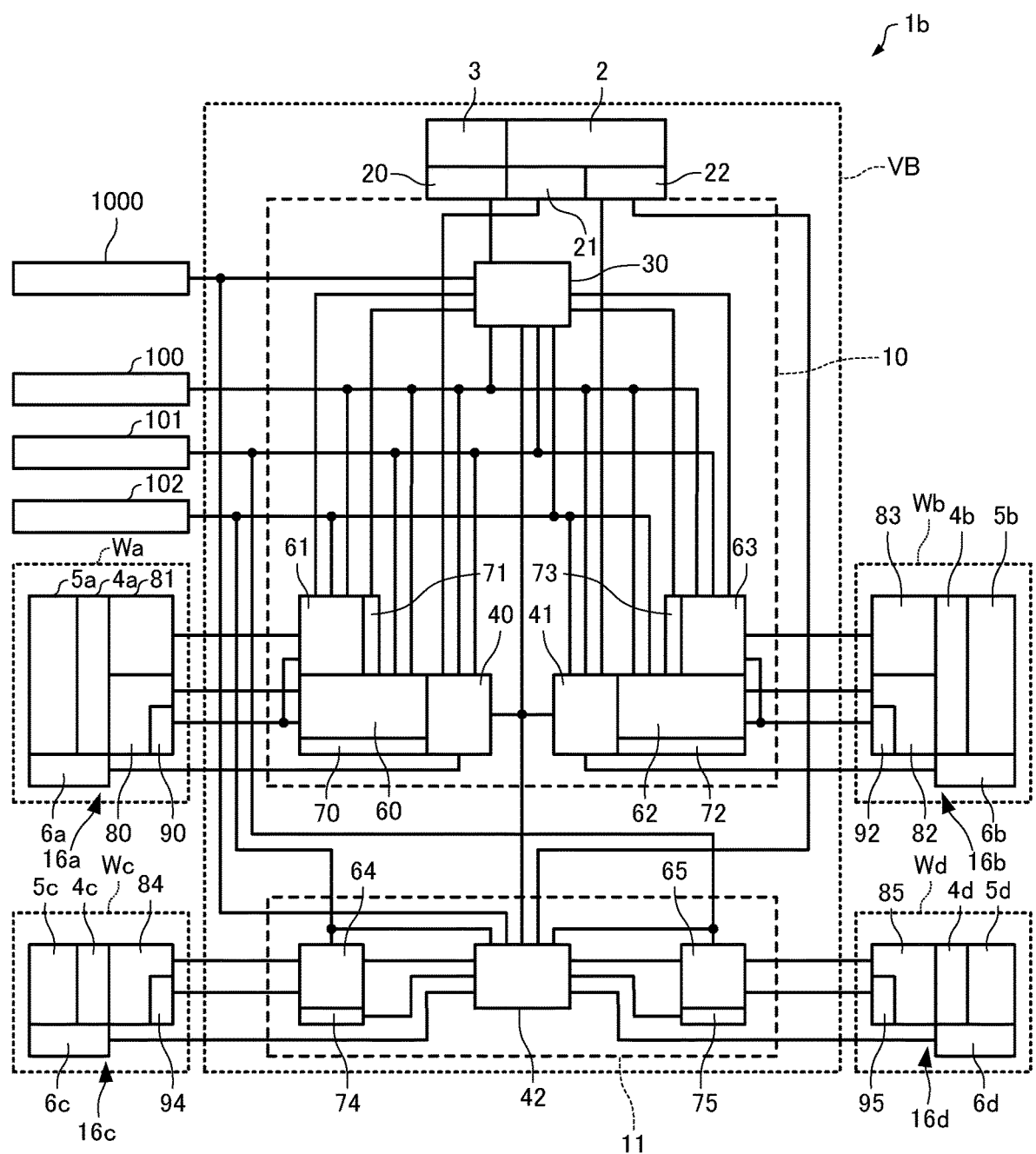
FIG. 4 is an overall configuration diagram illustrating a vehicle brake system according to Modified Example 2.

A vehicle brake system 1b according to Modified Example 2 will be described with reference to FIG. 4. FIG. 4 is an overall configuration diagram illustrating the vehicle brake system 1b according to Modified Example 2. In the following descriptions, the same components as in the vehicle brake systems 1 and 1a of FIGS. 1 to 3 are denoted by the same reference signs in FIG. 4, and detailed descriptions thereof will be omitted. Further, in the vehicle brake system 1b, configurations of the master controller 30 and the first to third sub-controllers 40 to 42 are the same as in FIG. 2, and thus diagrams and descriptions thereof are omitted.

As illustrated in FIG. 4, in the vehicle brake system 1b, the first control device 10 is provided integrally with the stroke simulator 3 and the stroke sensors 20 to 22. That is, the stroke simulator 3 and the stroke sensors 20 to 22 may be housed in a chassis made of synthetic resin, and one face of a chassis that houses the first control device 10 may be adhered to one face of the chassis that houses the stroke simulator 3 and the stroke sensors 20 to 22, to thereby integrally provide the first control device 10 with the stroke simulator 3 and the stroke sensors 20 to 22. Alternatively, one face of a chassis that houses the first control device 10 and the stroke sensors 20 to 22 may be adhered to one face of a chassis that houses the stroke simulator 3, to thereby integrally provide the first control device 10 with the stroke simulator 3 and the stroke sensors 20 to 22.

According to the vehicle brake system 1b of Modified Example 2, the first control device 10 on which the master controller 30, the first sub-controller 40, and the second sub-controller 41 are mounted is provided integrally with the stroke simulator 3 and the stroke sensors 20 to 22, thus achieving space saving and improving mountability onto the vehicle VB.

The invention is not limited to the embodiments described above, and various modifications are possible. For example, the invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

REFERENCE SIGNS LIST 1, 1a, 1b Vehicle brake system
2 Brake pedal
3 Stroke simulator
4a to 4d Decelerator
5a to 5d Brake caliper
6a to 6d Load sensor
10 First control device
11 Second control device
16a to 16d Electric brake
20 First stroke sensor
21 Second stroke sensor
22 Third stroke sensor
30 Master controller
301 Driver control unit
302 Braking force calculation unit
303 Behavior control unit
304 Determination unit
First sub-controller
400 Driver control unit
402 Braking force calculation unit
404 Determination unit
41 Second sub-controller
410 Driver control unit
412 Braking force calculation unit
414 Determination unit
42 Third sub-controller
420 Driver control unit
422 Braking force calculation unit
424 Determination unit
60 to 65 Driver
70 to 75 Current sensor
80 to 85 Motor
90, 92, 94, 95 Rotation angle sensor
100 to 102 Battery
1000 Other control devices
VB Vehicle
Wa to Wd Wheel

The invention claimed is:

1. A vehicle brake system comprising:
first and second electric brakes, each of the first and second electric brakes including at least one unit of an electric actuator that presses a friction pad toward a rotor side;
a first driver that drives the electric actuator of the first electric brake;
a second driver that drives the electric actuator of the second electric brake;
a control device including a plurality of controllers connected to one another,
the first electric brake being provided to a first wheel of a vehicle, and
the second electric brake being provided to a second wheel of the vehicle,
the plurality of controllers including:
a master controller including a first driver control unit that controls the first and second drivers, a first braking force calculation unit that calculates braking force of the first and second electric brakes, and a behavior control unit that controls behaviors of the vehicle; and
a first sub-controller including a second driver control unit that controls only the first driver, and a second braking force calculation unit that calculates braking force of the first and second electric brakes,
a second sub-controller including a second driver control unit that controls only the second driver, a third braking force calculation unit that calculates braking force of the first and second electric brakes,
the first electric brake being controllable by both the master controller and the first sub-controller, and
the second electric brake being controllable by both the master controller and the second sub-controller,
wherein the behavior control unit is provided only in the master controller and outputs signals for controlling behaviors of the vehicle to the second driver control unit of the first sub-controller and to the third driver control unit of the second sub-controller.

2. The vehicle brake system according to claim 1, wherein the first and second wheels are front wheels of the vehicle.

3. The vehicle brake system according to claim 1, wherein the control device includes a first control device and a second control device; and
the first control device includes the master controller, the first sub-controller, and the second sub-controller.

4. The vehicle brake system according to claim 3, further comprising:
a brake pedal;
a stroke simulator connected to the brake pedal; and
a stroke sensor that detects an operation amount of the brake pedal, wherein
the first control device is provided integrally with the stroke simulator and the stroke sensor.

5. The vehicle brake system according to claim 1, wherein the first electric brake is provided to the first wheel and includes a plurality of first electric actuators, and the first driver includes a plurality of first drivers that individually drives the plurality of first electric actuators provided to the first wheel,
the master controller controls one of the plurality of first drivers, and
the first sub-controller controls another one of the plurality of first drivers.

6. The vehicle brake system according to claim 1, wherein the behavior control unit performs, as a control of behaviors of the vehicle, at least one of a control to prevent locking of the first and second wheels, a control to suppress slippage of the first and second wheels, and a control to suppress sideslip of the vehicle.

7. The vehicle brake system according to claim 1, wherein the second electric brake is provided to the second wheel and includes a plurality of second electric actuators, and the second driver includes a plurality of second drivers that individually, drives the plurality of second electric actuators provided to the second wheel,
the master controller controls one of the plurality of second drivers, and
the second sub-controller controls another one of the plurality of second drivers.

* * * * *